United States Patent [19]
Ernst et al.

[11] Patent Number: 5,214,231
[45] Date of Patent: May 25, 1993

[54] APPARATUS FOR ELECTRONIC TEACHING ACCOMPANIMENT AND PRACTICE OF MUSIC, WHICH IS INDEPENDENT OF A PLAYED MUSICAL INSTRUMENT

[76] Inventors: Wolfgang Ernst, Hebelstrasse 10/2, D-7562 Gernsbach; Norbert Lang, Kronenstrasse 22, D-7500 Karlsruhe, both of Fed. Rep. of Germany

[21] Appl. No.: 810,702

[22] Filed: Dec. 18, 1991

[30] Foreign Application Priority Data
Jan. 15, 1991 [DE] Fed. Rep. of Germany ....... 4100956
Oct. 9, 1991 [DE] Fed. Rep. of Germany ... 9112534[U]

[51] Int. Cl.⁵ ...................... G09B 15/04; G09B 15/08; G10H 1/42
[52] U.S. Cl. ...................... 84/652; 84/668; 84/670; 84/478
[58] Field of Search ............. 84/477 R, 478, 609–614, 84/634–638, 644–646, 649–652, 666–670, 718–722, DIG. 6

[56] References Cited
U.S. PATENT DOCUMENTS
4,422,365 12/1983 Iwaki ..................................... 84/478
4,651,612 3/1987 Matsumoto ........................ 84/478 X
4,694,723 9/1987 Shinohara et al. ................ 84/478 X OTHER PUBLICATIONS
"Musiprof-Bedienflache" Design by G. Knoppek, Version 2.2, Mar. 25, 1992.

Primary Examiner—Stanley J. Witkowski
Attorney, Agent, or Firm—Collard & Roe

[57] ABSTRACT

The invention relates to an electronic teaching, accompaniment and practice music apparatus which is independent of a played musical instrument. The apparatus includes devices for digital sound production, tempo setting, accompaniment, operation and input of digital note data, which are connected by means of a control unit, which is connected with an electro-acoustical device for acoustical reproduction of the note sequences corresponding to the input piece of music via a digital-analog converter. There is an optical display device which is connected with a piano keyboard or a guitar fingerboard or represents these, for optical display of the note sequences played.

21 Claims, 10 Drawing Sheets

APPARATUS FOR ELECTRONIC TEACHING ACCOMPANIMENT AND PRACTICE OF MUSIC, WHICH IS INDEPENDENT OF A PLAYED MUSICAL INSTRUMENT

BACKGROUND OF THE INVENTION

1. Field of the Invention

The present invention relates to an electronic teaching, accompaniment and practice music apparatus which is independent of a played musical instrument.

2. The Prior Art

In the field of electronic audio production, especially that of digital music production, the most varied instruments have already become known, such as electronic organs, synthesizers, samplers, etc., where each of these instruments is structured by the manufacturer according to a certain system, with the system being dependent on the company. The instruments can generally be connected together via a midi connection and be played and controlled from a keyboard or a sequencer.

The sequencers which have become known up to now are structured in such a way that they pass note sequences in the form of digital signals to the musical instrument, for example a synthesizer, via a midi connection, with the synthesizer reproducing the music piece via an electro-acoustical device, in accordance with the note sequence.

The sequencers which have become known up to now are either external devices or are devices built into the keyboards or electronic organs.

The external devices require the user to possess various other devices which are midi-capable, specifically the electronic audio generators. They furthermore require technical and musical training, otherwise the master sequences cannot even be played.

With the sequencers built into keyboards or organs, there is the prerequisite that the note sequence must be played in, i.e. the operator must be able to play music.

Sequencers have also become known which have data input devices, such as card readers or diskette drives, in which limited, manufacturer-dependent software material can be played in, using corresponding data media.

Furthermore, teaching methods with electronic support, which are exclusively manufacturer-specific, have become known. These instruments then serve only for key instruments, such as keyboards, where the note material used is limited accordingly, and is manufacturer-specific.

SUMMARY OF THE INVENTION

It is an object of the present invention to provide an electronic teaching, accompaniment and practice music apparatus which opens up the possibility, independent of the musical instrument being played, of making any desired note material available to any music player, not only as written or printed notes, but also in the form of acoustically, electronic-optically and digitalized note material.

The above object is achieved according to the present invention by providing an apparatus for electronic teaching, accompaniment and practice of music, said apparatus being independent of a played musical instrument, comprising a device for digital sound production, a device for tempo setting, a device for accompaniment, a device for operation, a device for input of digital note data, a control unit for connecting together each said device, an electro-acoustical device connected to said control unit for acoustical reproduction of note sequences corresponding to an input piece of music, a digital-analog converter for inputting said piece of music, and an optical display device which is connected with a piano keyboard or a guitar fingerboard or represents these, for optical display of the note sequences played.

Several advantages are achieved with the apparatus according to the invention. For example, any desired digital note data, which correspond to note sequences of music pieces, can be input by the input device, and these can then not only be reproduced acoustically with variable tempo and at any desired pitch, but also be displayed optically on a keyboard, a guitar fingerboard or a display device representing one of these devices. Therefore, the apparatus according to the invention can be used by anyone from an absolute beginner or layman, up to a professional musician. Furthermore, playing and practicing are made fun by playing ahead or along on any desired instrument, independent of the apparatus. The apparatus can furthermore be used as a theory teaching apparatus, e.g. for learning the theory of harmony, even without an additional instrument.

Since a person learning to play a musical instrument generally does not have a satisfactory listening experience until he can play at least halfway perfectly, the apparatus ensures that right from the beginning, the student hears the music correctly, leading him to play along perfectly.

Since the apparatus according to the invention may also contain a rhythm and accompaniment device, the player of any desired apparatus can obtain a perfect "accompaniment combo" for the note material, which is independent of the software of other electronic musical instruments.

One embodiment relates to the special structure of a front panel of a housing for holding the apparatus, where the keys for the pitch of the chords and the solo voices are located next to one another, together with the optical display device, especially the LED display elements, in an arrangement corresponding to the keyboard, in the area of the front bottom edge of the front panel. This makes it possible, in a simple manner, to set the apparatus up on a standard keyboard of a piano or any instrument with a keyboard, so that the display device can be used to follow the keys which must be pressed for playing the input piece of music.

In another embodiment, in order to take different key widths of the various musical instruments into consideration, a keyboard template which can be cut to size for different key widths can be attached below the keys for the pitch of the chords and the solo voices. The template can be cut to size depending on the width of the keyboard.

In a further embodiment, it is possible to set up the apparatus so it cannot slide, on any structure which is connected with the keyboard of a keyboard instrument, adjustable and supported towards the rear. This setup is in such a way that the LEDs are above the keyboard and they display which keys must be pressed by a beginner in the area of keyboard instruments.

In another embodiment, the apparatus according to the invention can also be used in an advantageous manner for guitars and lute instruments. For this, the optical display device, especially the LED display elements, includes a fingerboard reproduction, which is comprised of a strip which can be attached to the guitar or lute neck by means of a clamp device, where the display elements are arranged running crosswise to the strip, between the reproduced frets and strings.

In a still further embodiment, the apparatus can also be provided with a midi interface, which makes it possible to play the input notes also via other electronic musical devices.

Furthermore, display devices to display the tempo, the beat progression, as well as at least one loudspeaker can also be arranged at the front panel of the housing holding the apparatus.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
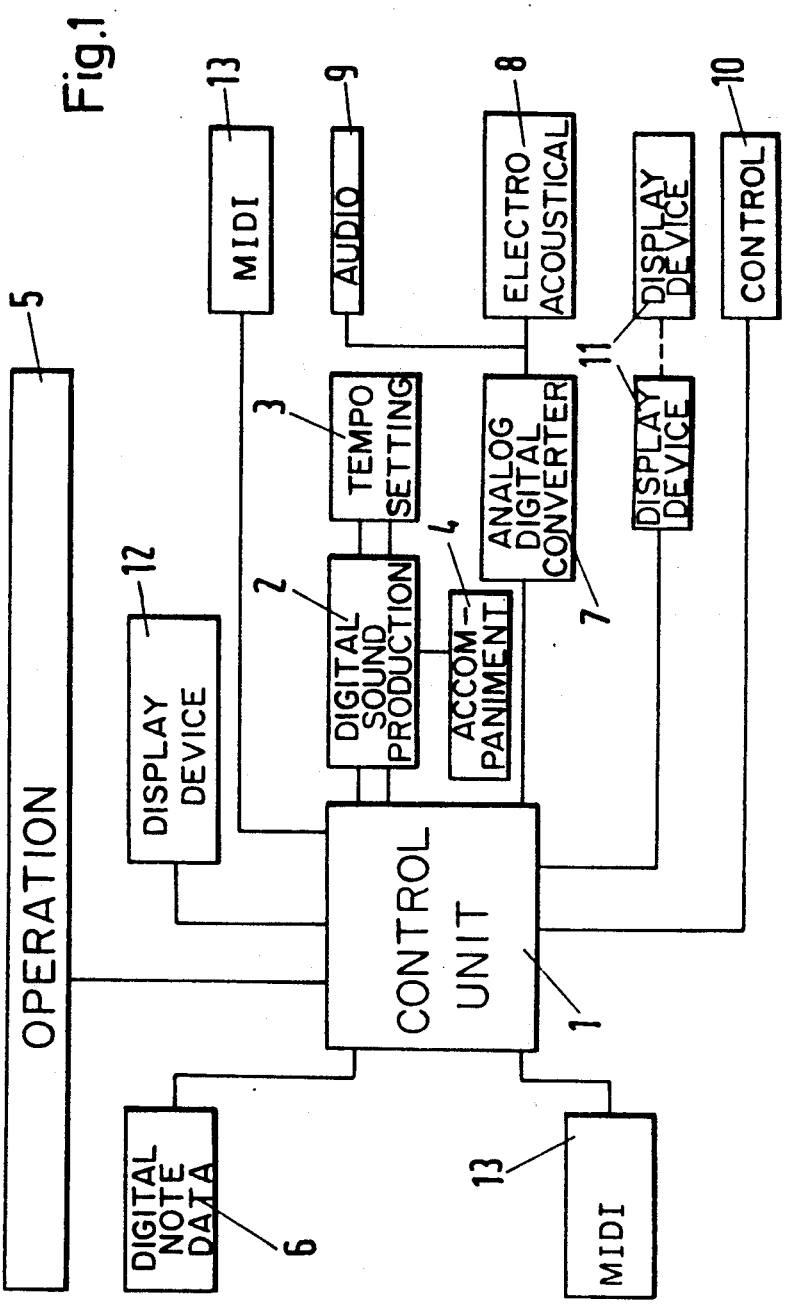
FIG. 1 is a block schematic of the apparatus according to the invention.

Turning now in detail to the drawings, as is evident from FIG. 1, the apparatus according to the invention includes a control unit 1, which can be a microprocessor with a memory and control elements (microcomputer), for example. Devices for digital sound production 2, tempo setting 3, accompaniment 4, operation 5 and input of digital note data 6, for example ROM cards, are connected with this control unit 1 via bus lines.

Furthermore, an electro-acoustical arrangement 8, if applicable with an audio output 9, is connected with the control unit 1 via an analog-digital converter 7. The electro-acoustical device can also contain the rhythm device, the accompaniment, the bass and the solo instruments.

A suitable connection for controlling external display devices is provided at 10.

Figure 4:
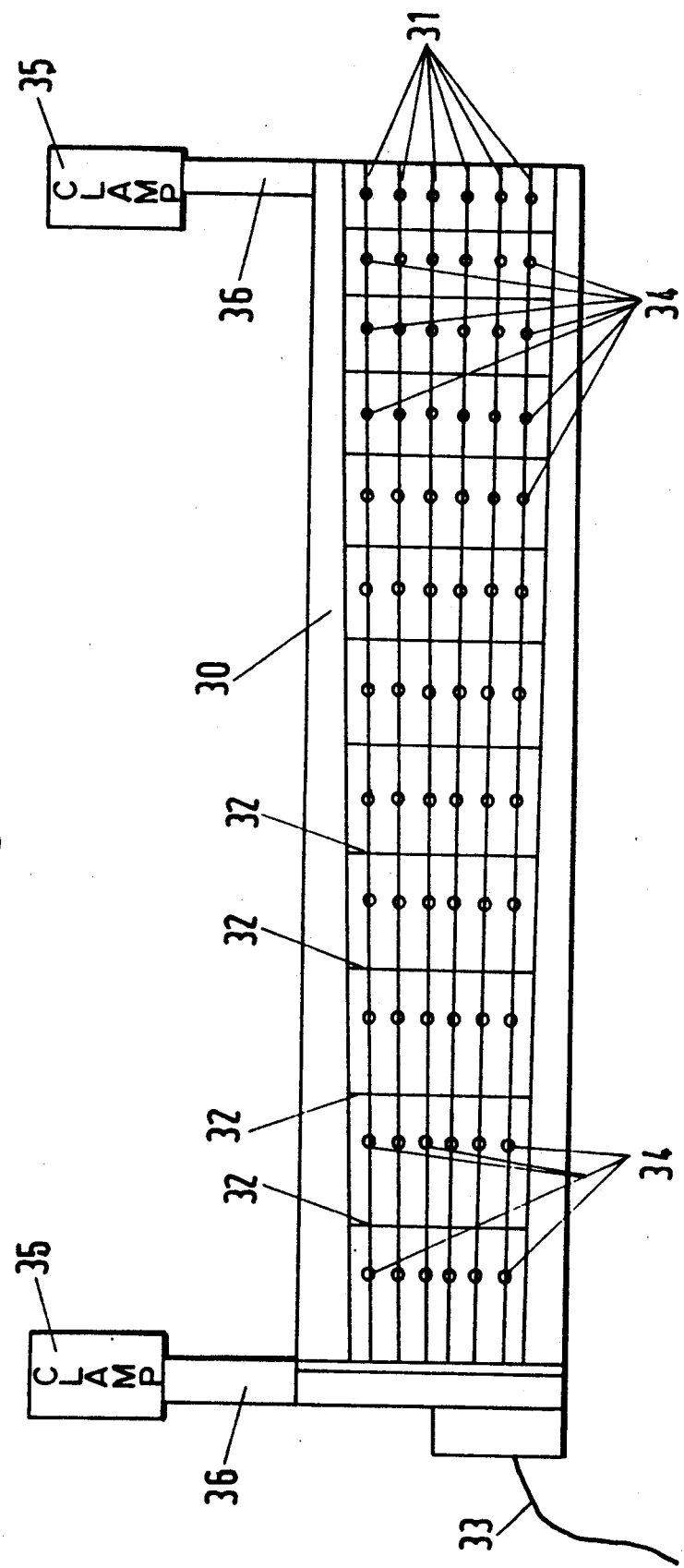
FIG. 4 shows a display device for a guitar or lute instrument.

The control device 1 can also be provided with a display device 11 for a guitar or lute instrument, which comprises a strip shown in FIG. 4, which has a fingerboard reproduction.

Finally, the control unit can also be connected with a display device 12, on which the midi channel number, the song number, the bar number, the tempo, the transposer, the tuner, etc. are displayed.

Finally, the control unit 1 can also be connected with one or more midi interface/midi interfaces 13.

Figure 2:
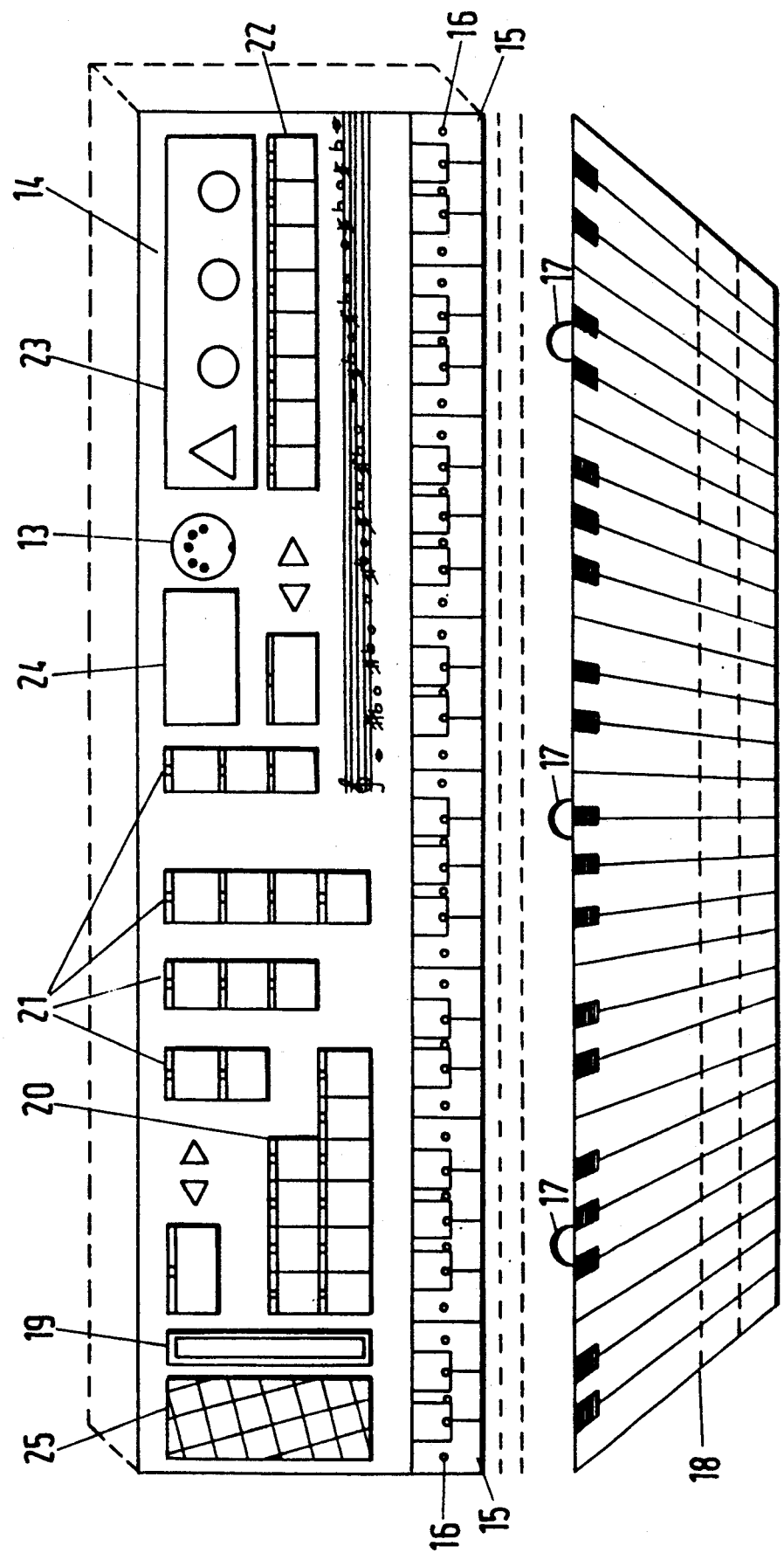
FIG. 2 shows a view of the front panel of the housing holding the apparatus, with a keyboard template that can be suspended from it.

As is evident from FIG. 2, several keys 15 for the pitch of the chords and the solo voices are arranged at the bottom edge of the front panel 14 of the housing holding the apparatus, in which there are LED display elements 16, where the arrangement of the keys is in accordance with a keyboard, with white and black keys. The distance is selected in such a way that it corresponds to the distance of a normal keyboard.

For an adaptation to different keyboard widths, a piano keyboard template 18 which can be cut to size for different keyboard widths can be attached at the bottom, using corresponding attachment elements 17.

The apparatus, with the front panel and, if necessary, the template, is set up in the rear area on the keyboard of a keyboard instrument, so that the keys to be pressed are indicated directly, with the corresponding display elements lighting up.

Furthermore, an insertion slot 19 for the data carrier of the note data to be input, as well as a key group 20 for chord composition, several key groups 21 for harmony and transposition, input, percussion, accompaniment and solo instruments, as well as a further key group 22 for input of the various rhythms, are also arranged in the front panel.

The beat progression can be followed on a display 23, and the tempo is displayed on a display 24. Finally, a loudspeaker 25 is also arranged on the front, behind a suitable cover.

Figure 3:
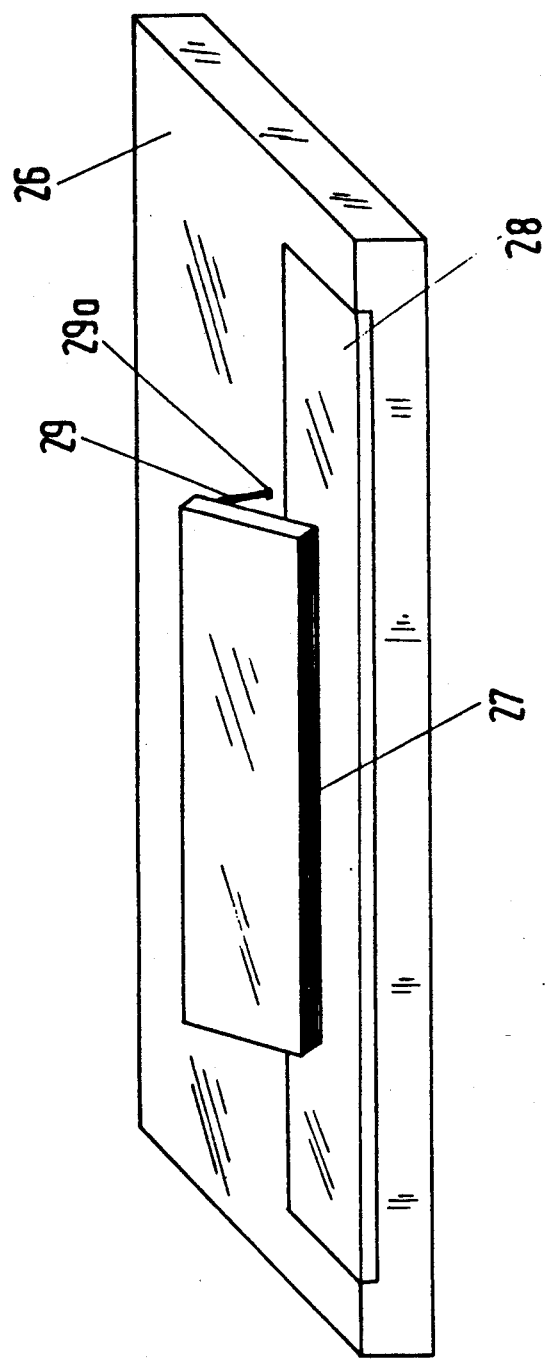
FIG. 3 shows a perspective view of the apparatus with a device for slip-free setup, supported from the rear.

FIG. 3 shows an embodiment for setting up the apparatus according to the invention on the keyboard 28 of an instrument 26 with slip-resistant edge 27 contacting the keyboard so that the apparatus will be slip-resistant. With this setup, the adjustable, rear support 29 with the slip-resistant feet 29a is set in such a way that the apparatus is set at a slight angle.

FIG. 4 shows another embodiment of the display device of the apparatus according to the invention. According to this embodiment, a strip 30 is provided, on which the reproduction of a fingerboard of a string instrument, for example a guitar or lute, is displayed. This reproduction comprises the strings 31 and the frets 32. In the area of the reproduced strings 31 and the reproduced frets 32, LED display elements 34 are provided, which run crosswise to the strip 30. The display elements are connected with the control unit 1 via a cable 33, with a corresponding matrix. The strip 30 furthermore has a clamp device 35 and spacers 36, in order to attach the strip 30 to a guitar or lute neck. In this way, the guitar can continue to be played independently, where the strings to be fingered can be identified by means of the LED display elements 34 of the strip 30. The control unit controls the display elements 34 in accordance with the input music piece, and at the same time, the sound to be produced with the guitar can be heard from the loudspeaker.

The apparatus according to the invention can be used in many different ways. For example, it can be used by a private music teacher in individual or group instruction, in schools, for self-teaching as well as in pre-school musical education, where the apparatus can be used for any imaginable musical instrument and also for singing instruction.

Figure 5:
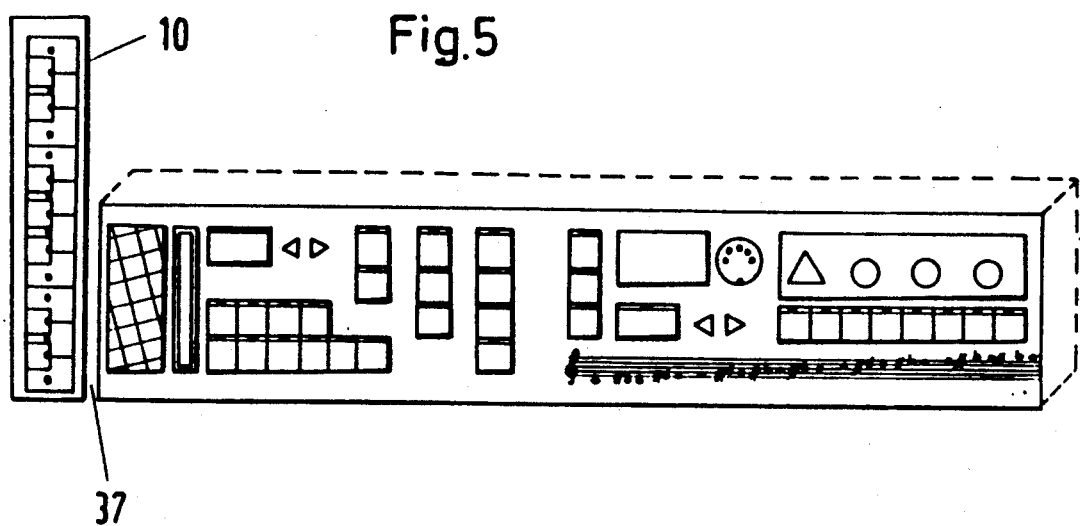
FIG. 5 shows a display device for a musical instrument plugged into the apparatus of the invention.
Figure 6:
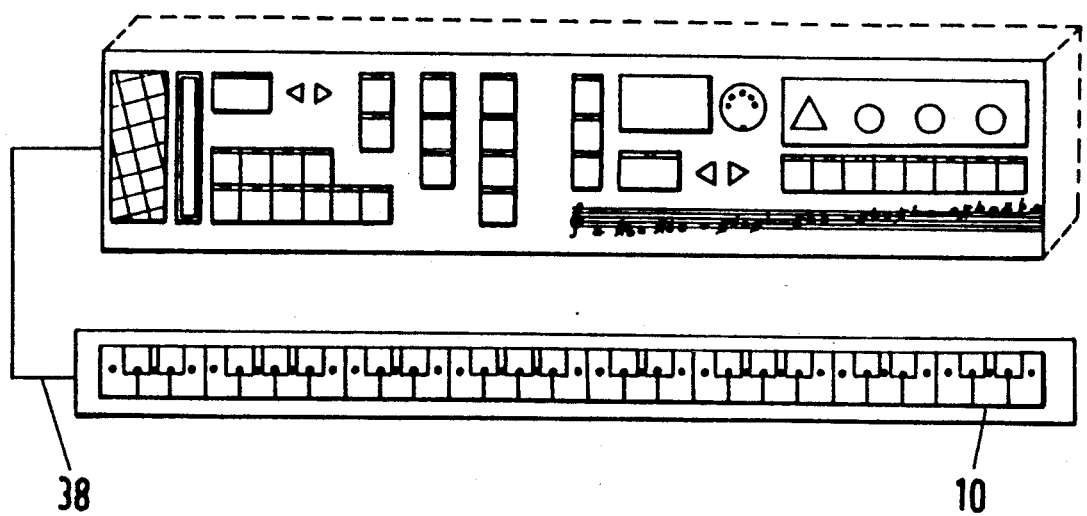
FIG. 6 shows the display device connected to the apparatus by means of a cable.

The optical display device 10 with which the position of the operating elements can be represented specifically for the musical instrument can also be attached or plugged into the apparatus by means of a plug connection 37, as shown in FIG. 5. It is also possible, as shown in FIG. 6, to connect the display device 10 to the apparatus by means of a cable 38, and then to use it at any desirable location, preferably in the immediate vicinity of the musical instrument. All external display devices have their own little control unit for instrument-specific processing of the data supplied by the apparatus. This results in complete independence from the played musical instrument, which can be a mechanical or electronic musical instrument. It is particularly advantageous in this connection that the optical display is accompanied by exact acoustical playing of the notes, so that the person playing the instrument can play along and thus has the possibility of practicing using the apparatus, by adjusting the speed of play.

Figure 7:
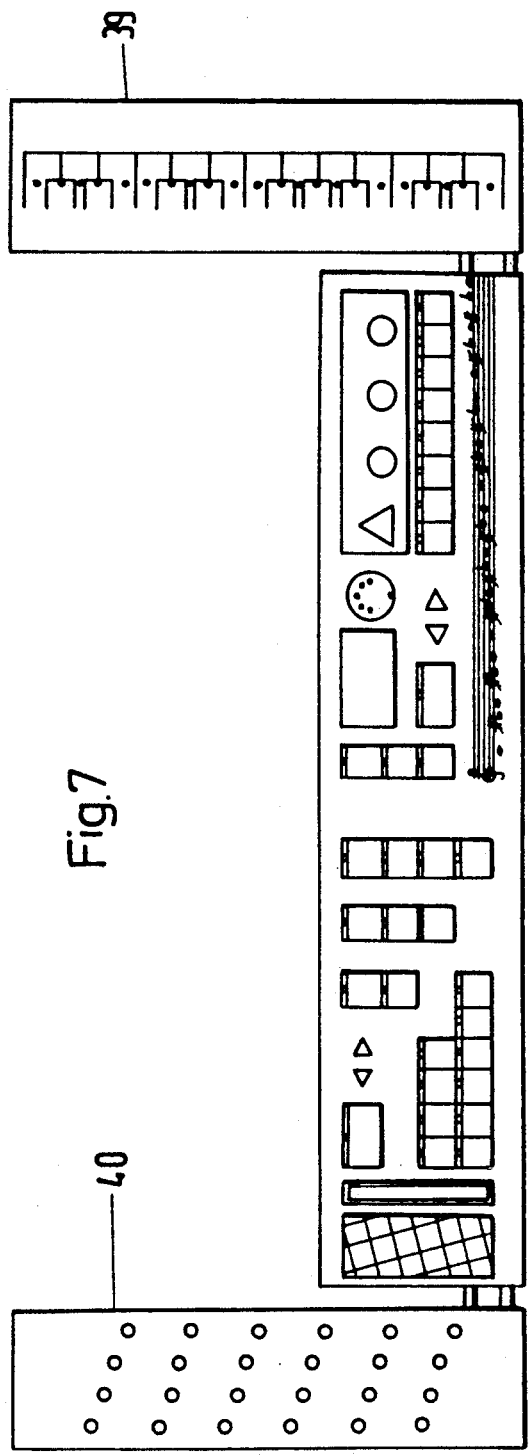
FIG. 7 shows the combination of two display devices which can be used to practice playing an accordion.

FIG. 7 shows a combination of two display devices 39, 40, which can be used to practice playing an accordion. The right display device 39 represents the keyboard, using the LEDs, and the left display device 40 represents the button strip of the bass representation using LEDs.

Figure 8:
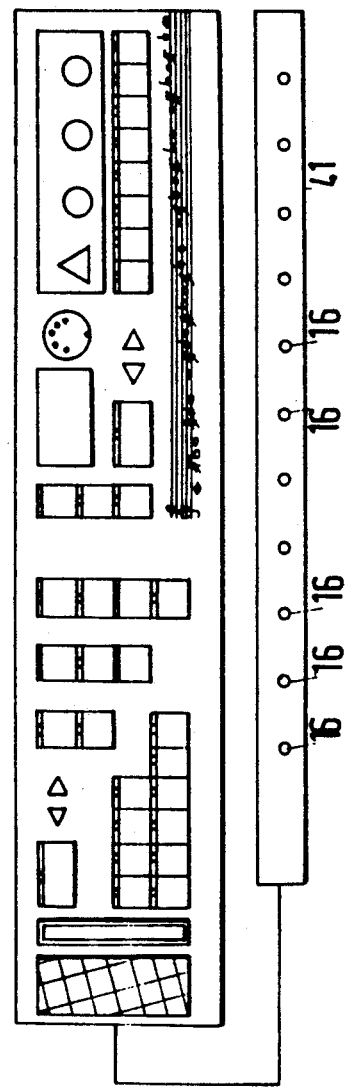
FIG. 8 shows the apparatus with a display device representing a flute.

FIG. 8 shows the apparatus in connection with a display device 41 which represents a flute. The keys or holes to be operated are shown by the LEDs 16. The same arrangement can also be represented for recorders, alto recorders or piccolos, with a vertical arrangement. Finally, a variation of other wind instruments, for example clarinets, saxophones, is also possible, with the LEDs showing the valves to be operated. The oboe, the bassoon, etc., can also be represented in the same manner.

Figure 9:
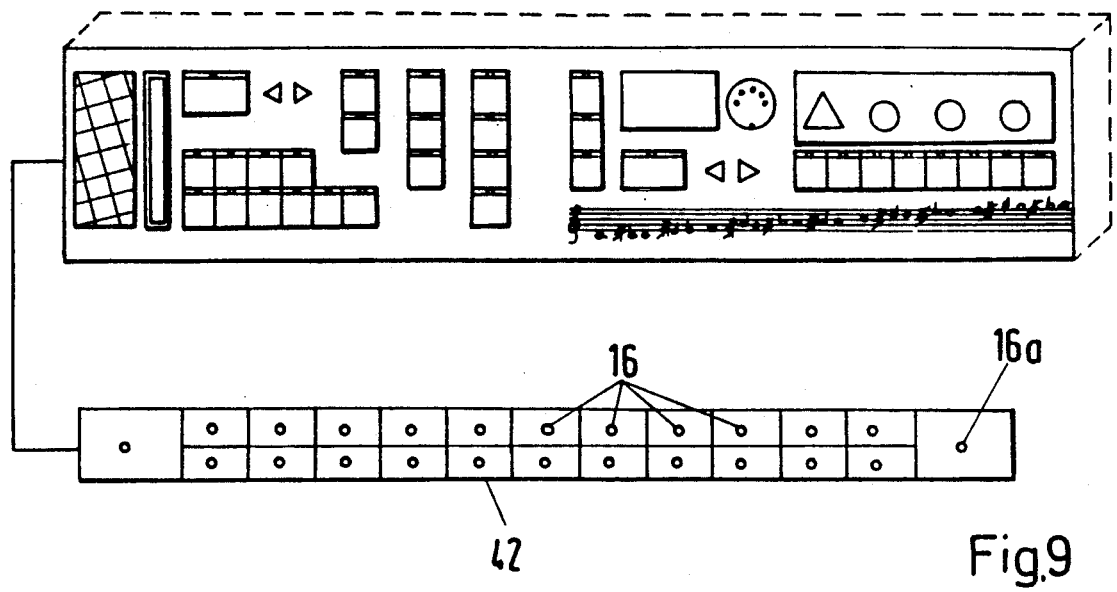
FIG. 9 shows the display device representing a harmonica.

FIG. 9 shows an arrangement in which the display device 42 represents a harmonica. The LEDs 16 can be shown in two colors, for breathing in and out. 16a shows the operation of the slide.

Figure 10:
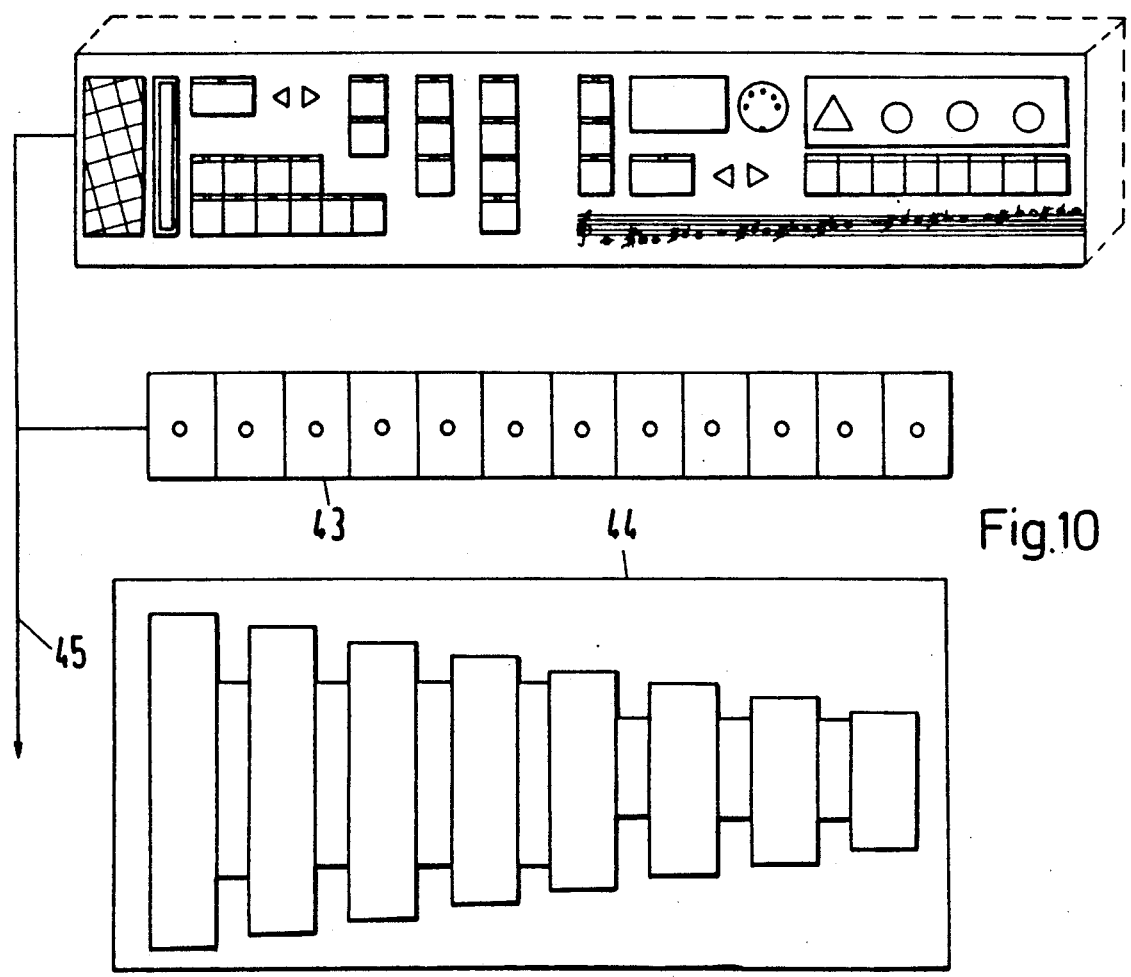
FIG. 10 shows the display device for a percussion instrument.

FIG. 10 shows a display device 43 for a percussion instrument 44, for example a xylophone, a metallophone, a glockenspiel, etc. A serial connection 45 can also be provided, by means of which additional display devices can be added. In this way, group playing is possible.

Figure 11:
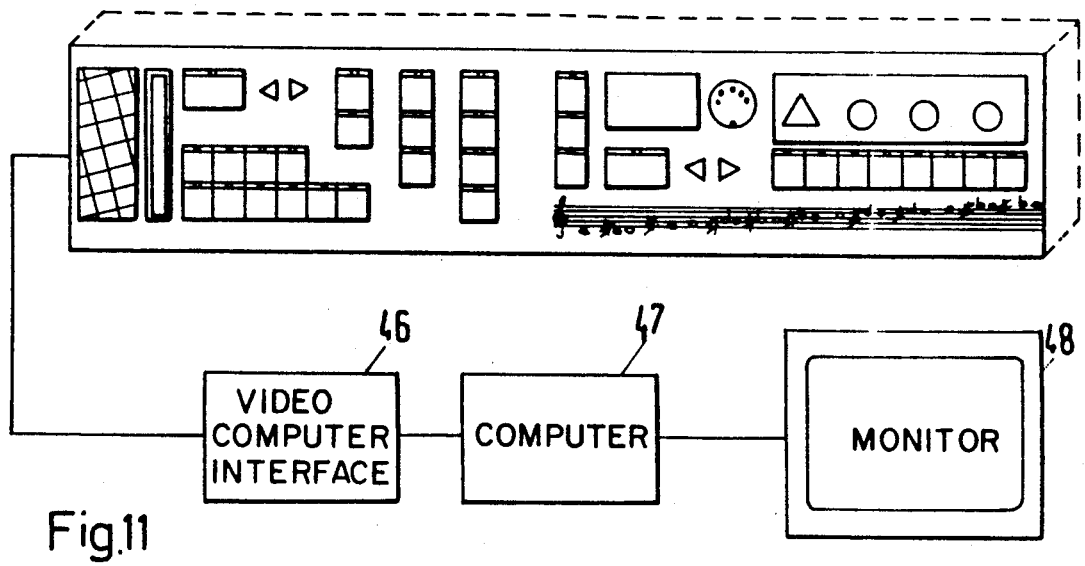
FIG. 11 shows the display device connected to a video computer interface, a computer, and a monitor.

FIG. 11 shows another embodiment for using the apparatus according to the invention. There, the display device with cable connection includes a video computer interface 46, which is connected with a computer 47 and a monitor 48. This arrangement can be used for any imaginable instruments, theory programs, ear training, etc., for existing computer learning programs, e.g. guitar, keyboard, etc. The apparatus can be used for any note material which can be read into the apparatus, and for any instrument. In this manner, group instruction with different instruments or the same instrument, or also individually, can be carried out. The apparatus controls a monitor for each student, via the video computer interface; the notes being played at the moment by the apparatus, according to the notes given, and to be played along by the student, are displayed on the monitor. In addition, the monitor displays a representation of the operation of his instrument, with finger and hand position, for the student.

Figure 12:
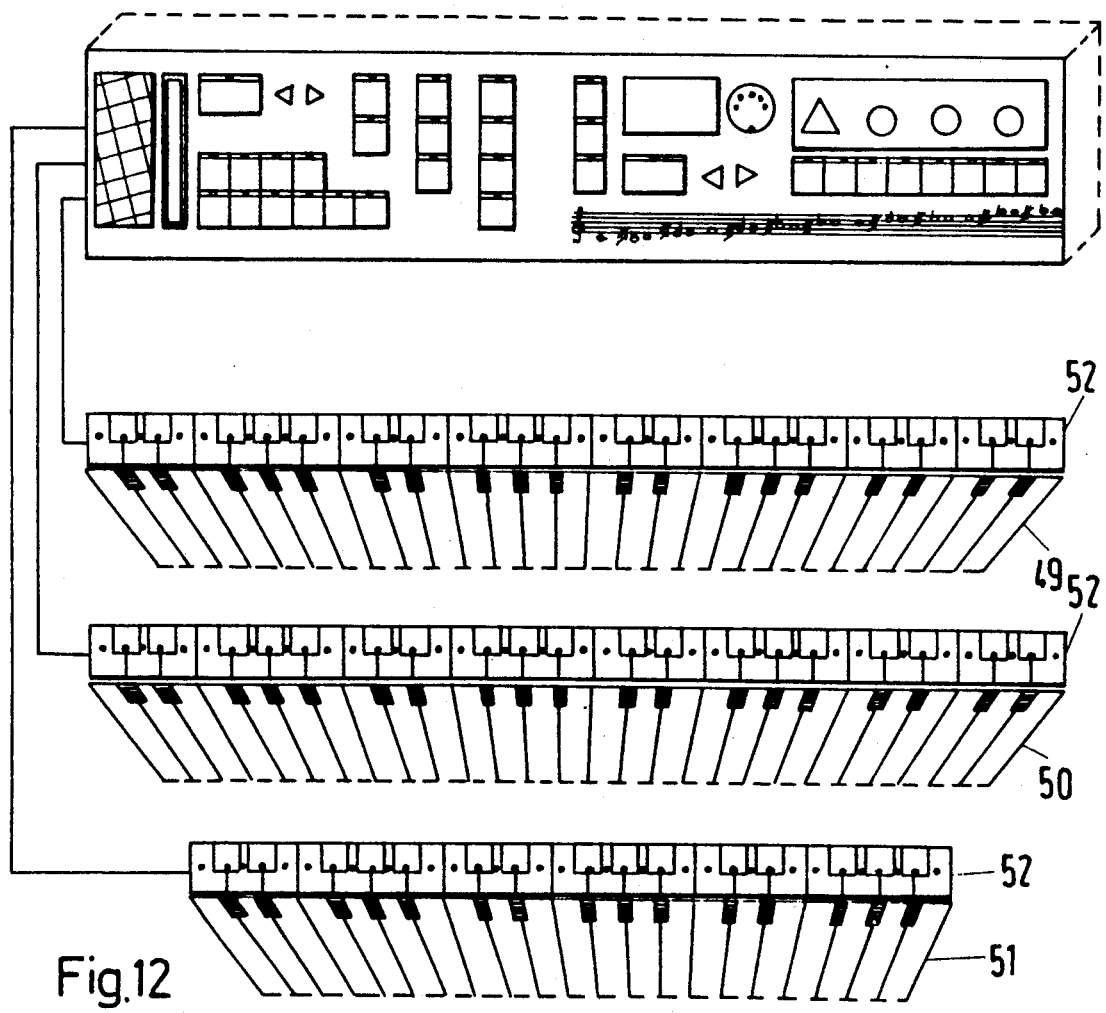
FIG. 12 shows apparatus for use with a two manual organ with pedal.

A further embodiment is shown in FIG. 12, for using the apparatus for a two-manual organ with pedal. A display strip 52 is assigned to each manual 49, 50, as well as to the pedal 51, which carries out the display according to the note material of the organ. The same arrangement can also be used in simplified form, for a piano with one manual, or a harpsichord, a spinet or similar instrument.

Figure 13:
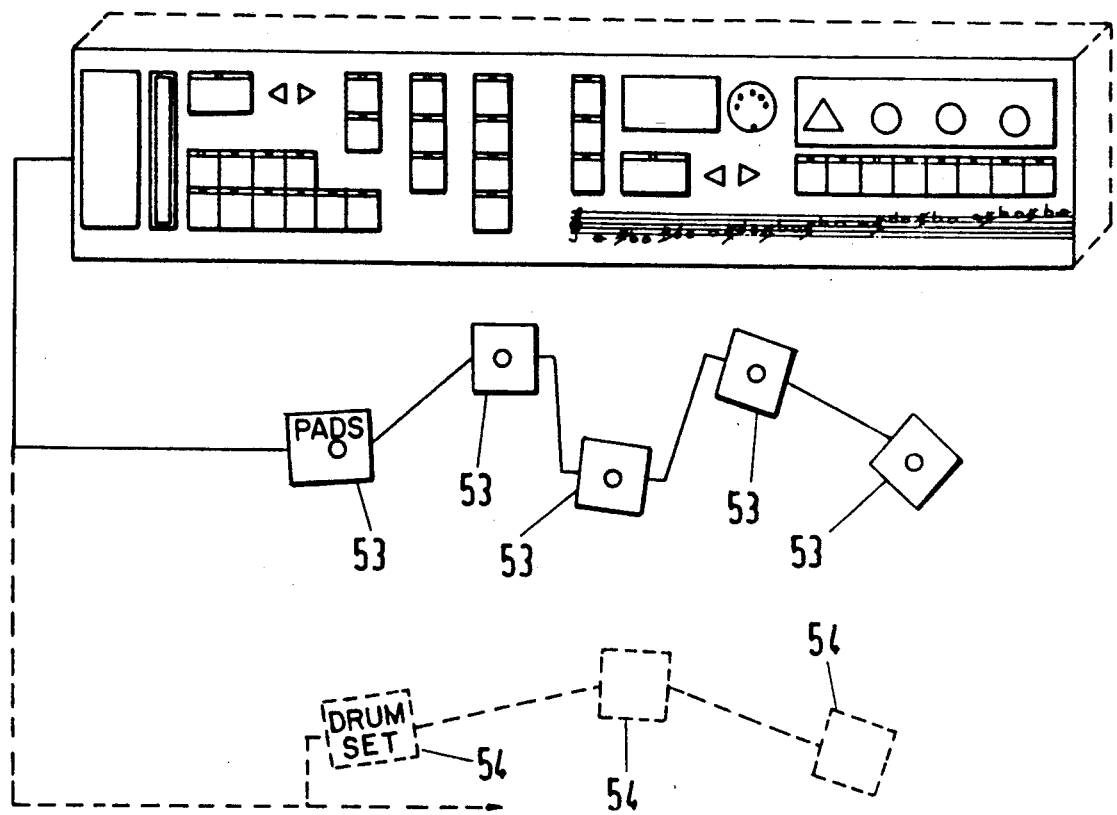
FIG. 13 shows apparatus for the activation of a drum set.

FIG. 13 shows an embodiment for representing the activation of a percussion instrument, for example a drum set. There the apparatus is connected, via a cable, with the pads 53, which are provided with LEDs attached to the percussion instrument with a VELCRO fastener or hook and loop-type fastener, for example.

It is also possible, as shown with a broken line at 54, to provide additional drum sets in a serial circuit, where each player can play along on a solid pedagogical foundation, where the LEDs light up in accordance with the learning program and the note copies used. In this way, group playing with any desired percussion instruments, for example with the Orff instruments, can be carried out, where group playing, solo, accompaniment, bass and percussion can be represented via a serial circuit device which is generally present on each display device.

Figure 14:
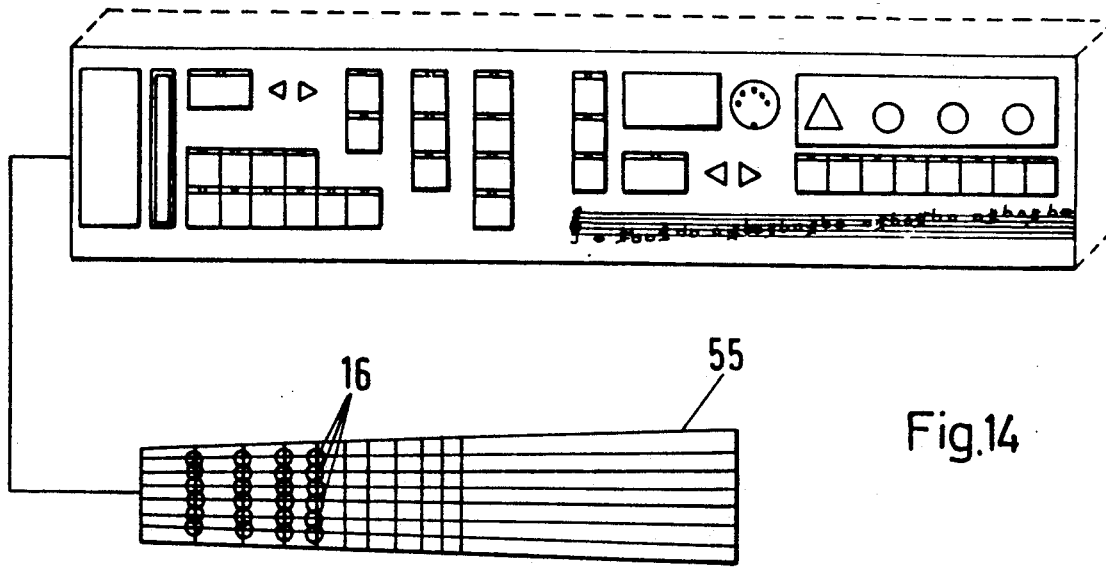
FIG. 14 shows the display device for use with a string instrument.

FIG. 14 shows an embodiment of carrying out a display device 55 for any desired string instrument, such as guitar, bass, banjo, violin, cello, Hawaiian guitar, zither, cymbal [sic], etc.

The notes can always be displayed and played by the apparatus, and any note material can be used, and no specific preparation, with the exception of digitalization, is necessary. The apparatus is therefore basically independent of manufacturer, model or instrument.

Figure 15:
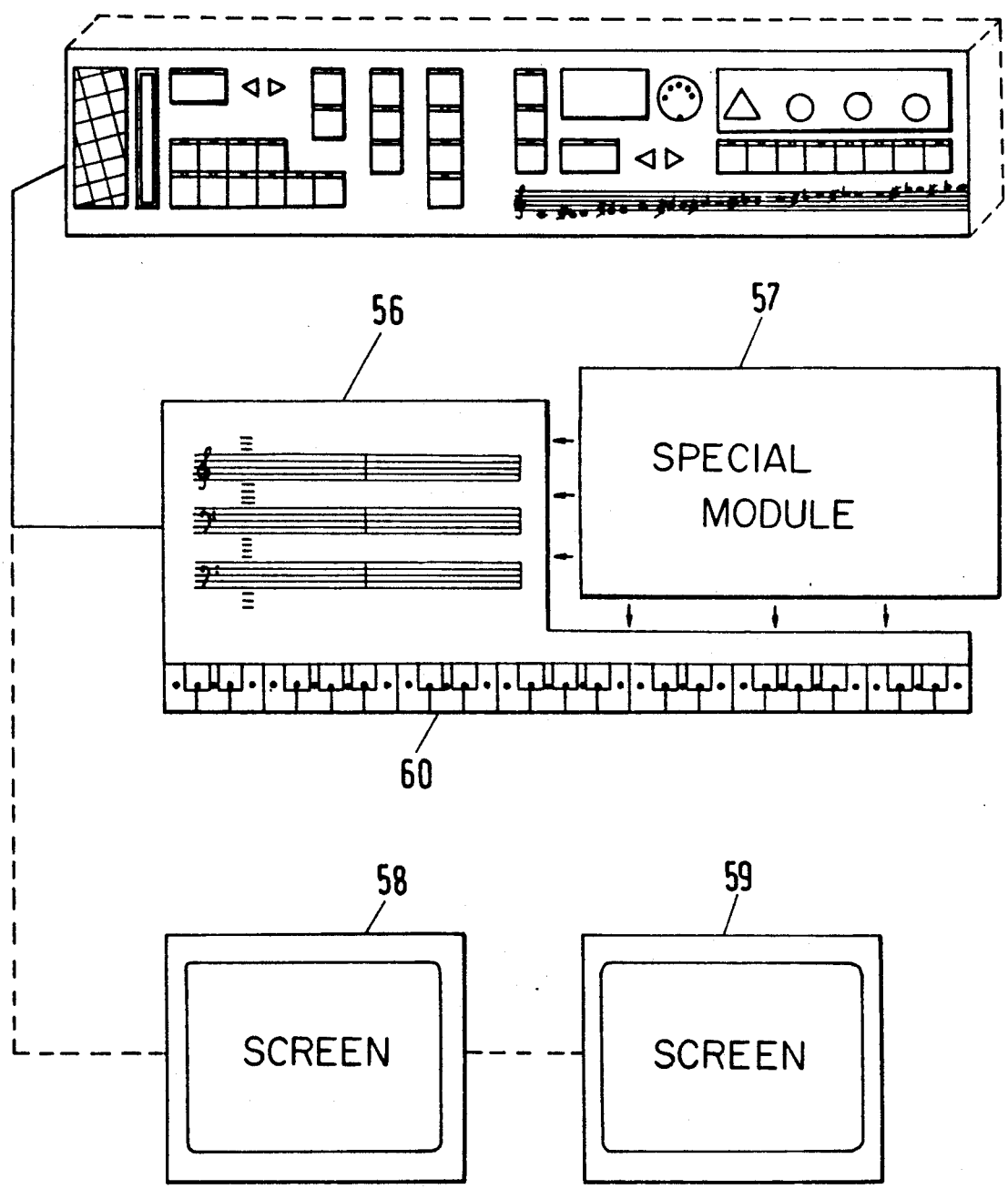
FIG. 15 shows the apparatus connected to an arrangement for group instruction.

FIG. 15 shows an embodiment providing a basic arrangement for group instruction. Here, the apparatus is connected, via cable, with a panel 56, on which the individual notes are represented by LEDs, in a large display. At the side of this panel, there is a special module 57, which can be plugged in and carries out the display for each specific instrument on a large screen or similar device. It is also possible, however, to provide two large screens 58, 59, which are also connected with the apparatus via cables, in order to represent the changing notes on one screen 58, and the activation device specific to the musical instruments on the other screen 59.

The modular construction is such that a keyboard 60 is represented as a fixed component, with optical display of the individual tones, and a staff representation, if necessary with optical display of the octave. In modular manner, all the instrument displays listed above can be used, depending on the instrument being taught. The apparatus controls the panel, which is "intelligent" and has various switching devices, such as "Start/Stop" and "Pause." With the alternative screen representation 58, 59, as explained, the one screen for note display can be used separately from the other screen for finger and hand position.

While several embodiments of the present invention have been shown and described, it is to be understood that many changes and modifications may be made thereunto without departing from the spirit and scope of the invention as defined in the appended claims.

What is claimed is:

1. An apparatus for electronic teaching, accompaniment and practice of music, said apparatus being independent of a played musical instrument comprising
   - a device for digital sound production;
   - a device for tempo setting;
   - a device for accompaniment;
   - a device for operation;
   - a device for input of digital note data;
   - a control unit for connecting together each said device;
   - an electro-acoustical device connected to said control unit for acoustical reproduction of note sequences corresponding to an input piece of music;
   - a digital-analog converter for inputting said piece of music;
   - a piano keyboard or a guitar fingerboard;
   - an optical display device which is connected with said piano keyboard or said guitar fingerboard, for optical display of the note sequences played; and
   - wherein the optical display device is structured as a reproduction of the operation or activation elements of the corresponding musical instrument, and is attached or plugged into the apparatus directly with plugs, or is set up at a remote location with cables.

2. The apparatus according to claim 1, further comprising
   - a housing for holding the apparatus, said housing having a front panel, said front panel having a front bottom edge; and
   - the device for operation comprising several keys which are arranged on said front panel of said housing holding the apparatus, in such a way that the keys for the pitch of the chords and the solo voices are located next to one another, together with the optical display device, in an arrangement corresponding to the keyboard, in the area of said front bottom edge of said front panel.

3. The apparatus according to claim 2, further comprising
   - a piano keyboard template which can be cut to size for different key widths and is attached below the keys for controlling the pitch of the chords and the solo voices.

4. The apparatus according to claim 2,
   - wherein said apparatus has a bottom;
   - wherein said housing has a back;
   - a slip-resistant covering is located at the bottom of the apparatus; and
   - a support with a slip-resistant foot is located at the back of the housing, which foot is adjustable in length and inclination.

5. The apparatus according to claim 1, further comprising
   - a midi interface connection connected to the control device.

6. The apparatus according to claim 2,
   - wherein the display device to display the tempo, the display device for the best progression, and a loudspeaker, are each arranged on the front panel of the housing holding the apparatus, behind a cover.

7. An apparatus for electronic teaching, accompaniment and practice of music, said apparatus being independent of a played musical instrument comprising
   - a device for digital sound production;
   - a device for tempo setting;
   - a device for accompaniment;
   - a device for operation;
   - a device for input of digital note data;
   - a control unit for connecting together each said device;
   - an electro-acoustical device connected to said control unit for acoustical reproduction of note sequences corresponding to an input piece of music;
   - a digital-analog converter for inputting said piece of music;
   - an optical display device which is connected therewith for optical display of the note sequences played;
   - wherein said optical display device is an optical display device for a guitar or lute instrument having a lute neck comprising a strip reproducing a fingerboard, having frets and strings reproduced thereon;
   - LED display elements arranged on said strip between the frets at the level of the reproduced strings;
   - a cable for connecting said display elements with the control unit and with a matrix circuit;
   - a clamp device and spacers for attaching the strip to the guitar or lute neck; and
   - wherein the optical display device is structured as a reproduction of the operating or activation elements of the corresponding musical instrument, and is attached or plugged into the apparatus directly with plugs, or is set up at a remote location with cables.

8. An apparatus for electronic teaching, accompaniment and practice of music, said apparatus being independent of a played musical instrument comprising
   - a device for digital sound production;
   - a device for tempo setting;
   - a device for accompaniment;
   - a device for operation;
   - a device for input of digital note data;
   - a control unit for connecting together each said device;
   - an electro-acoustical device connected to said control unit for acoustical reproduction of note sequences corresponding to an input piece of music;
   - a digital-analog converter for inputting said piece of music;
   - an optical display device which is connected therewith for optical display of the note sequences played;
   - wherein the optical display device is structured as a reproduction of the operating or activation elements of the corresponding musical instrument, and is attached or plugged into the apparatus directly with plugs, or is set up at a remote location with cables.

9. The apparatus according to claim 8,
   - further comprising an accordion having a bass part with a button arrangement and having a tenor part with a keyboard;
   - wherein the display device comprises a first part and a second part, and each part is equipped with LEDs; and
   - said LEDs of the second part represent the button arrangement of the bass part of an accordion and the LEDs of the first part represent the keyboard of the tenor part of an accordion.

10. The apparatus according to claim 8, further comprising a flute having holes or keys; and wherein the display device comprises an elongated strip or a housing having LEDs which represent the holes or keys of said flute.

11. The apparatus according to claim 10, further comprising a recorder, an alto recorder or a piccolo, each having holes or keys; and wherein the LEDs represent the holes or keys of said recorder, said alto recorder or said piccolo.

12. The apparatus according to claim 10, further comprising a saxophone, a clarinet or an oboe, each having keys or valves; and wherein the LEDs represent the keys or valves of said saxophone, said clarinet, or said oboe.

13. The apparatus according to claim 8, further comprising a harmonica with holes; and wherein the display device comprises an elongated strip or housing in which the LEDs represent the holes of said harmonica.

14. The apparatus according to claim 8, wherein the display device comprises a video computer interface;

a cable for connecting said interface with the apparatus; and a PC for connecting said interface with a monitor to represent the corresponding symbols.

15. The apparatus according to claim 8, further comprising an organ having individual manuals and a pedal; and wherein the display device comprises one or more strips which are arranged above said individual manuals and the pedal of said organ.

16. The apparatus according to claim 8, further comprising a xylophone, a metallophone, or a glockenspiel with each having a sounding board; and wherein the display device comprises a strip or an elongated housing in which the LEDs are arranged in the arrangement of the sounding board of said xylophone, said metallophone, or said glockenspiel.

17. The apparatus according to claim 16, wherein several display devices for several instruments are interconnected with a serial circuit for group instruction.

18. The apparatus according to claim 8, wherein the display device comprises a percussion instrument having pads, and wherein the LEDs are attached to the percussion instrument with a VELCRO hook and loop-type fastener.

19. The apparatus according to claim 8, wherein several display devices for participating instruments are connected to the apparatus, in order to carry out group playing.

20. The apparatus according to claim 8, wherein the display device is structured as a modular panel having corresponding display modules; and cables for connecting said display modules with the apparatus.

21. The apparatus according to claim 20, comprising two large screens for display of the notes and display of the instrument activation being connected with the apparatus.

* * * * *